US008950675B2

(12) United States Patent
White

(10) Patent No.: US 8,950,675 B2
(45) Date of Patent: *Feb. 10, 2015

(54) PERSONAL IDENTIFICATION CARD SCANNING TOOL AND METHOD OF USING THE SAME

(71) Applicant: Election Administrators, LLC, Saint Louis, MO (US)

(72) Inventor: Martin White, Clayton, MO (US)

(73) Assignee: Election Administrators, LLC, Saint Louis, MO (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/685,175

(22) Filed: Nov. 26, 2012

(65) Prior Publication Data

US 2014/0144989 A1   May 29, 2014

(51) Int. Cl.
*G06K 7/10* (2006.01)
*G06K 9/24* (2006.01)
*H04N 7/18* (2006.01)
*G06K 7/015* (2006.01)

(52) U.S. Cl.
CPC . *H04N 7/18* (2013.01); *G06K 7/015* (2013.01)
USPC ........................................ 235/462.2; 235/486

(58) Field of Classification Search
USPC ...................... 235/454, 462.14, 462.2, 486
See application file for complete search history.

(56) References Cited

U.S. PATENT DOCUMENTS

| 6,633,223 | B1 * | 10/2003 | Schenker et al. | 340/5.53 |
| 2003/0089832 | A1 * | 5/2003 | Gold | 248/454 |
| 2004/0150628 | A1 * | 8/2004 | Huang et al. | 345/173 |
| 2005/0013102 | A1 * | 1/2005 | Poulsen | 361/683 |
| 2007/0075204 | A1 * | 4/2007 | Fertil | 248/309.1 |
| 2007/0170248 | A1 * | 7/2007 | Brundage et al. | 235/380 |
| 2009/0178938 | A1 * | 7/2009 | Palmer | 206/45.23 |
| 2010/0080543 | A1 * | 4/2010 | Yu et al. | 396/5 |
| 2012/0224323 | A1 * | 9/2012 | Yang | 361/679.55 |
| 2013/0134061 | A1 * | 5/2013 | Wu et al. | 206/320 |
| 2013/0213838 | A1 * | 8/2013 | Tsai et al. | 206/320 |
| 2013/0316650 | A1 * | 11/2013 | Reed | 455/41.2 |

* cited by examiner

Primary Examiner — Tuyen K Vo
(74) Attorney, Agent, or Firm — Thompson Coburn LLP

(57) ABSTRACT

A personal identification card scanning tool comprises a first holding portion that is configured and adapted to hold a portable computing device, and a second holding portion that is configured and adapted to hold a personal identification card in a particular orientation and position relative to the portable computing device such that a line-of-sight exists between at least a portion of the portable computing device and at least a portion of the personal identification card. The relative orientation and position between the portable computing device and the personal computing device optimizes the ability for the portable computing device's camera to scan optical information provided on the personal identification card.

15 Claims, 4 Drawing Sheets

PERSONAL IDENTIFICATION CARD SCANNING TOOL AND METHOD OF USING THE SAME

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND

1. Field of the Invention

The present invention pertains to scanning tools. More particularly, the present invention pertains to a scanning tool for optically scanning personal identification cards using the camera of a portable computing device. Even more particularly, the present invention pertains to a scanning tool that is configured to hold a personal identification card in a particular position relative to the camera of the portable computing device, which maximizes the ability of the portable computing device to quickly and accurately optically scan information provided on the personal identification card.

2. General Background

In various situations, it is helpful to be able to optically scan information provided on personal identification cards into a computing device. For example, police officers may find it helpful to scan driver's licenses to avoid errors in recording identification information. It also may be useful for bars and nightclubs to optically scan information provided on personal identification cards to verify the age of customers, especially in low light situations. Still further, voter polling places can benefit from optically scanning information provided on personal identification cards to lower voter fraud.

Most modern portable computing devices, such as tablet computers and cell phones, include a camera. Such devices can run software applications that allow the computing devices to optically scan data using their cameras. In addition to optical character recognition software, such devices may include software for scanning one-dimensional bar codes, such as universal product codes, and two-dimensional matrix codes, such as quick response and PDF 417 codes.

There are difficulties associated with scanning personal identification cards with portable computing devices like cell phones and tablet computers. For example, it is particularly difficult to scan PDF 417 barcodes found on the back of state driver's licenses. It is often not easy to align the camera of the computing device in a manner such that the information provided on the personal identification card can be optically scanned. Moreover, it often takes an appreciable amount of time to adjust the distance and angle between a barcode on the personal identification card and the camera to obtain sufficient imaging clarity. In some situations, such delays can be highly problematic, taking up to 30 to 60 seconds.

SUMMARY OF THE INVENTION

The present invention overcomes the difficulties associated with scanning personal identification cards using portable computing devices. In accordance with the present invention, a scanning tool is configured to hold a personal identification card in a particular position relative to the camera of the portable computing device, which maximizes the ability of the portable computing device to quickly and accurately optically scan information provided on the personal identification card.

In one aspect of the present invention, a personal identification card scanning tool comprises a first holding portion that is configured and adapted to hold a portable computing device in a particular orientation and comprises a second holding portion that is configured and adapted to hold a personal identification card in a particular orientation. The first holding portion is structurally connected to the second holding portion in a manner such that a camera of a portable computing device and a personal identification card are fixed in relative positions and orientations with respect to each other and are generally parallel to and spaced apart from each other when the portable computing device is held by the first holding portion and the personal identification card is held by the second holding portion. The scanning tool is further configured and adapted such that a line-of-sight exists between the camera of the portable computing device and at least a portion of the personal identification card when the portable computing device is held by the first holding portion and the personal identification card is held by the second holding portion.

Another aspect of the present invention provides for a method of optically scanning information provided on a personal identification card. The method comprises activating a camera provided on a portable computing device to optically scan information provided on a personal identification card. In the method, a portable computing device and an identification card are held by a scanning tool comprising a first holding portion that holds the portable computing device in a particular orientation and a second holding portion that holds the personal identification card in a particular orientation. The first holding portion is structurally connected to the second holding portion in a manner such that the camera of the portable computing device and the personal identification card are fixed in relative positions and orientations with respect to each other and are generally parallel to and spaced apart from each other in a manner such that the camera of the portable computing device is able to focus on the information provided on the personal identification card and such that the information provided on the personal identification card is generally maximized in the camera's field-of-view.

These and other aspects of the invention will become apparent to those skilled in the art in light of the following disclosure and accompanying drawings.

BRIEF DESCRIPTION OF THE DRAWING FIGURES

For a better understanding of the present invention, reference may be made to the accompanying drawings in which.

Figure 1:
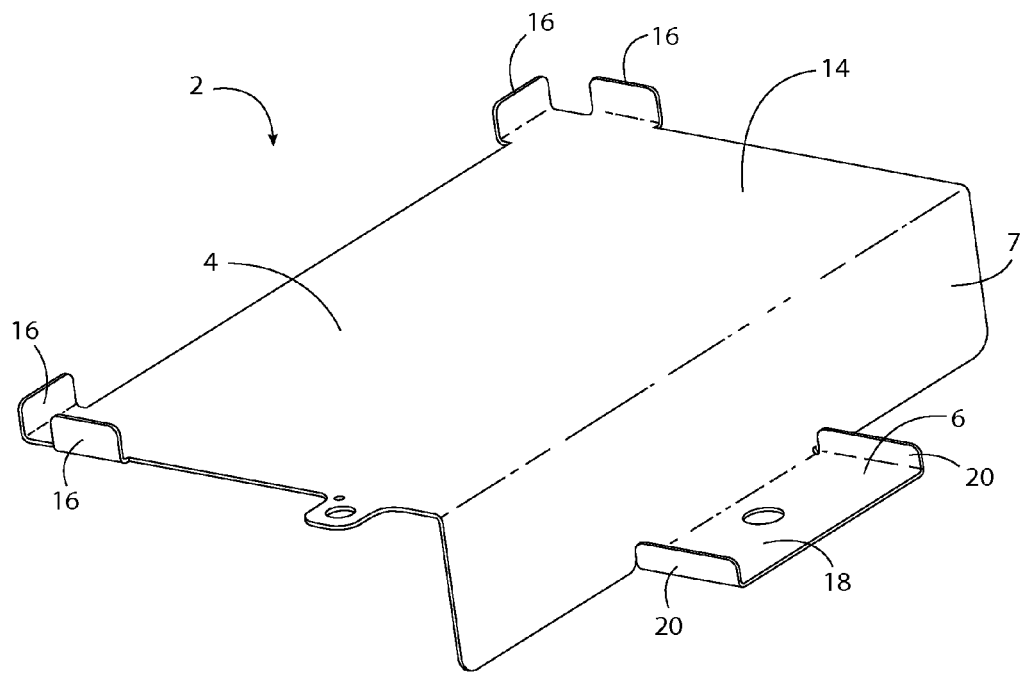
FIG. 1 is a perspective view showing a personal identification card scanning tool in accordance with the invention, showing the top, front, and left sides of the scanning tool.

Reference numerals in the written specification indicate corresponding items shown throughout the drawing figures.

DETAILED DESCRIPTION

Figure 2:
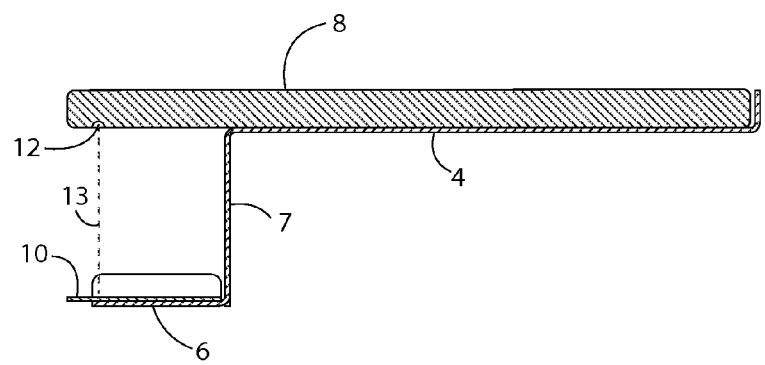
FIG. 2 is a cross-sectional right side view showing of the scanning tool shown in FIG. 1 holding a portable computing device and a personal identification card.
Figure 3:
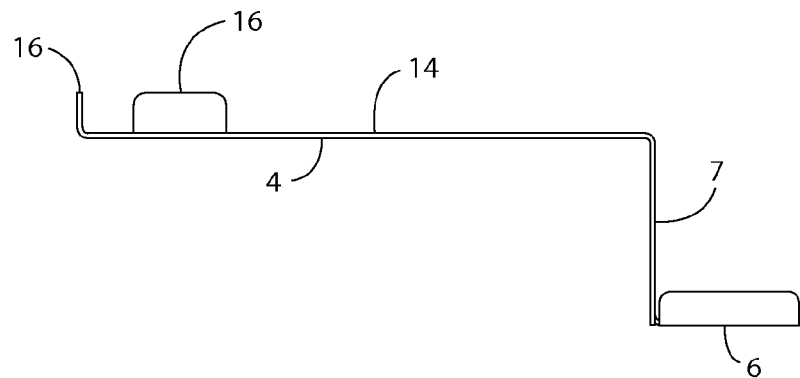
FIG. 3 is a left side view of the scanning tool shown in FIG. 1.
Figure 4:
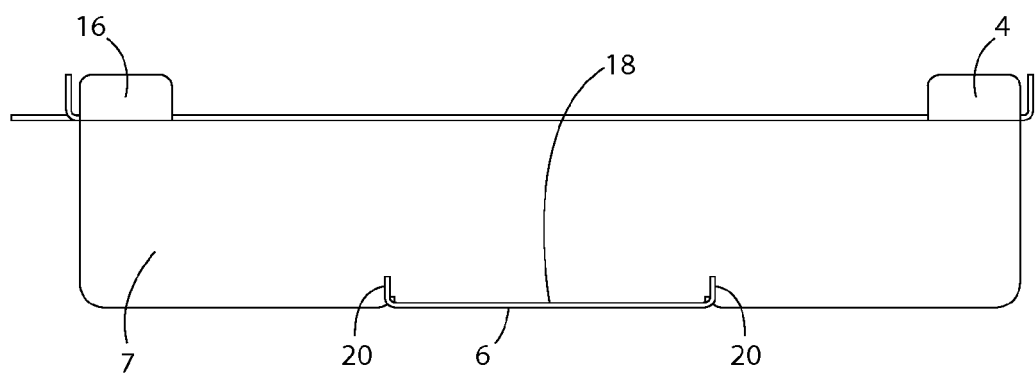
FIG. 4 is a front view of the scanning tool shown in FIGS. 1 and 3.
Figure 5:
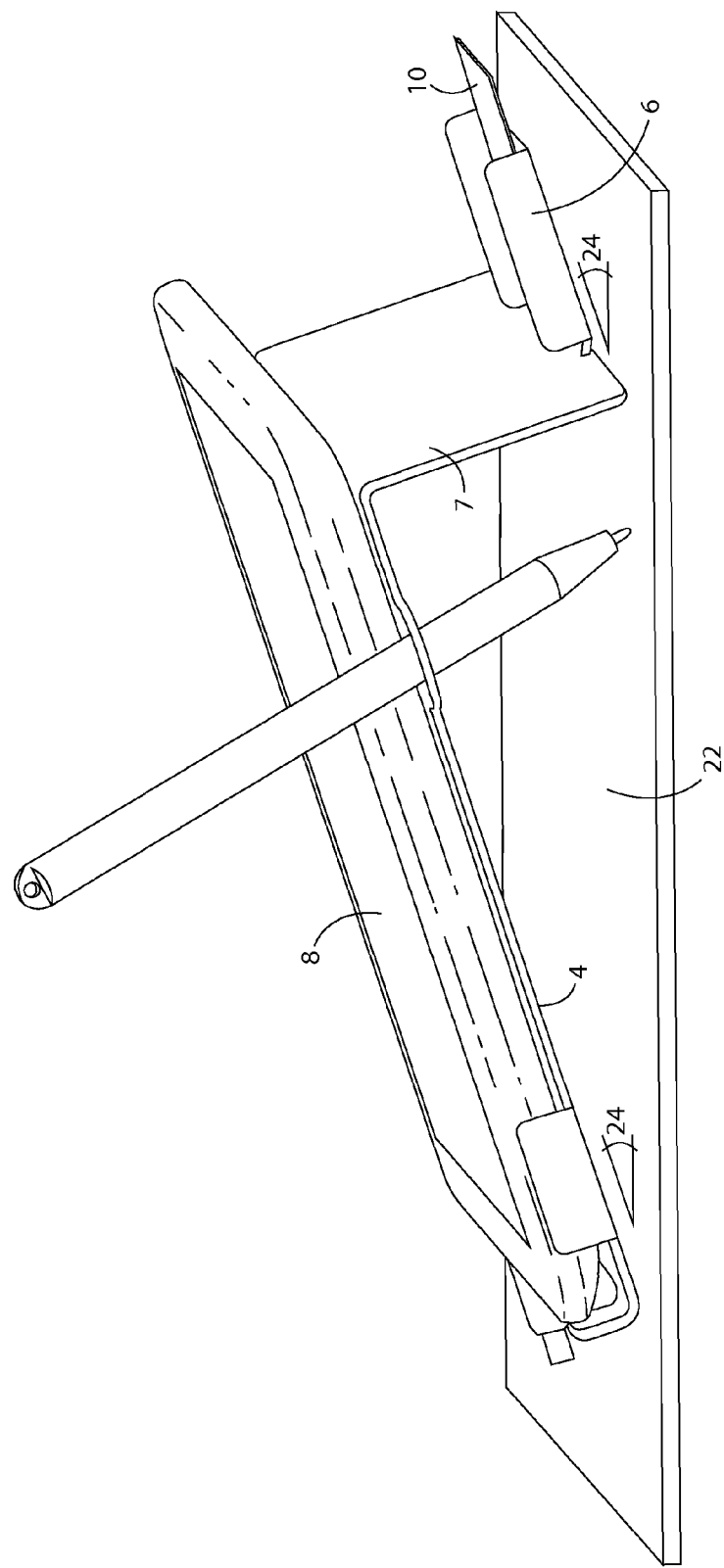
FIG. 5 is a perspective view of the scanning tool shown in FIGS. 1, 3, and 4, with the scanning tool placed on a flat surface and holding a personal identification card and a portable computing device.

An embodiment of a scanning tool in accordance with the invention is shown by itself in FIGS. 1, 3, and 4, and is generally indicated by the reference numeral 2. The scanning tool 2 comprises a first holding portion 4, a second holding portion 6, and a connecting wall 7. The first holding portion 4 is configured and adapted to hold a portable computing device 8 in a particular orientation, such as shown in FIGS. 2 and 5. The portable computing device 8 may be any type portable computing device such as, but not limited to, a tablet computer, a laptop computer, or a cell phone, which comprises a camera and the ability to scan information via the camera. The second holding portion 6 of the scanning tool 2 is configured and adapted to hold a personal identification card 10 in a particular orientation. The first holding portion 4 and the second holding portion 6 are structurally connected to each other by the connecting wall 7. The scanning tool 2 is preferably configured such that, when a portable computing device 8 is held by the first holding portion 4 and a personal identification card 10 is held by the second holding portion 6, the portable computing device and the personal identification card are fixed in relative positions and orientations with respect to each other. Preferably the portable computing device 8 and the personal identification card 10 are held generally parallel to and spaced apart from each other to place them in a position and orientation that optimizes the ability of the camera 12 of the personal computing device to image the information on the personal identification card.

FIG. 2 depicts a cross-sectional side view of the scanning tool 2 with the second holding portion 6 on the left holding a personal identification card 10, and a portable computing device 8 being held by the first holding portion 4. The plane of the cross-section is taken through the camera 12 of a portable computing device 8. As shown, when a portable computing device 8 is held by the first holding portion 4 and a personal identification card 10 is held by the second holding portion 6, a line-of-sight (dashed line 13) exists between the camera 12 of the portable computing device and at least a portion of the personal identification card. Preferably, when a portable computing device 8 is held by the first holding portion 4 and a personal identification card 10 is held by the second holding portion 6, the desired information provided on the personal identification card is generally maximized in the camera's 12 field-of-view and is in focus. However, if such information cannot be both maximized in the camera's 12 field-of-view and in focus, preferably the information is shrunk in the camera's 12 field-of-view only to the degree necessary to achieve a proper focus. This is achieved by configuring the scanning tool 2 such that the distance between the personal identification card 10 and the camera 12 of the portable computing device 8 is equal to or greater than the camera's minimum focal distance, which can be achieved by properly dimensioning the height of the connecting wall 7 between the first holding portion 4 and the second holding portion 6. The information within the camera's 12 field-of-view may also be set by properly dimensioning the height of the connecting wall 7 and/or by properly setting the location of the second holding portion 6 front-to-back and side-to-side relative to the camera's 12 location. One of skill in the art will recognize that such parameters can be determined for use with different camera positions and camera properties of various portable computing devices and with different formats and/or positions of information on different personal identification cards.

As shown in the figures, the first holding portion 4 of the scanning tool 2 preferably comprises a surface 14 and a plurality of retaining members 16. The surface 14 of the first holding portion 4 is configured to support a portable computing device 8 that is biased against the surface by gravity. Thus, the gravity and the surface 14 prevent movement of the portable computing device in a first direction, namely, in a direction normal to the surface. The retaining members 16 are preferably perpendicular to the surface 14 so as to limit or prevent movement of the portable computing device 8 by contact in at least one of the other two oblique directions (oblique relative to the normal of the main surface 14) relative to the first holding portion 4. As shown, the retaining members 16 are more preferably configured such that at least one retaining member lies on each side of the four sides of the portable computing device 8 so as to thereby prevent movement of the portable computing device in both of the oblique directions relative to the first holding portion 4. As used herein, movement in a "direction" means positive or negative movement along a vector. Thus, to prevent or limit relative motion in a direction as mentioned herein requires limiting both positive and negative movement along a vector.

Like the first holding portion 4 of the scanning tool 2, the second holding portion 6 comprises a surface 18 and a plurality of retaining members 20. When a personal identification card 10 is biased against the surface 18 by gravity, gravity and the surface prevent movement of the personal identification card in a first direction that is normal to the surface. The retaining members 20 limit movement of the personal identification card 10 in at least one of the other two oblique directions relative to the second holding portion 6. More preferably, the retaining members 20 limit movement of the personal identification card 10 in just one of the other two oblique directions and gravity and the connecting wall 7 of the scanning tool 2 is configured to serve as a means of aligning the personal identification card along the other of the oblique directions (by contact). Thus, it should be appreciated that the personal identification card 10 can be slid off of the surface 18 of the second holding portion 6 away from the connecting wall 7.

The first holding portion 4, the second holding portion 6, and the connecting wall 7 of the scanning tool 2 are all preferably formed as a single monolithic body from a single piece of sheet metal. The sheet metal is preferably aluminum or stainless steel. The surface 14 of the first holding portion 4 and the surface 18 of the second holding portion 6 are preferably parallel to each other, and the connecting wall 7 is preferably perpendicular thereto. The retaining members 16 of the first holding portion 4 are preferably simple tabs that are bent upward, perpendicular to the surface 14 of the first holding portion. Likewise, the retaining members 18 of the second holding portion 6 are preferably tabs that are bent upward, perpendicular to the surface 20 of the second holding portion. As shown, the scanning tool 2 may also comprise other elements, such as a stylist holder 21. As is also shown, the stylist holder 21 may simply be a tab that comprises a circular opening and that extends in a coplanar manner from the surface 14 of the first holding portion 4.

The embodiment of the scanning tool 2 described above is particularly well suited for use at voter polling places. In use at such a polling place, the scanning tool 2 is preferably placed on a flat surface 22, such as a desk. As shown in FIG. 5, the configuration of the scanning tool 2 is such that the surface 14 of the first holding portion 4 and the surface 18 of the second holding portion 6 are oriented at an angle 24 relative to the flat surface 22. Preferably the angle 24 is between ten and twenty-five degrees. More preferably, the angle 24 is between fifteen and twenty degrees. The angle allows a voter and/or a poll worker to easily view the information displayed on a portable computing device 8 being held by the first holding portion 4 of the scanning tool 2 when the voter or poll worker is sitting or standing behind the scanning tool. By positioning the second holding portion 6 of the scanning tool 2 at the front of the scanning tool, a voter can easily place his or her personal identification card 10 on the second holding portion 6 of the scanning tool while sitting or standing in front of the scanning tool. Also, by positioning the second holding portion 6 of the scanning tool 2 at the front of the scanning tool, a poll worker can easily place a voter's personal identification card 10 on the second holding portion 6 of the scanning tool while sitting or standing in front of the scanning tool. The configuration of the scanning tool aids in the placement of a personal identification card, for example, a poll worker can easily place a voter's personal identification card 10 on the second holding portion 6 of the scanning tool while sitting in front of the scanning tool simply by feeling for the second holding portion 6 and placing the personal identification card 10 in between the retaining members 20. The inclination angle 24 of the surface 18 of the second holding portion 6 of the scanning tool 2, and gravity, will ensure that the personal identification card 10 contacts the connecting wall 7 of the scanning tool, which ensures that the personal identification card 10 is optimally positioned relative to the camera 12 of the portable computing device 8. Once this is done, the operator of the portable computing device 8 can use the camera 12 of the portable computing device 8 to scan optical information provided on the personal identification card 10 into the portable computing device. Because the scanning tool 2 holds the personal identification card 10 in the optimum position for scanning relative to the portable computing device 8, no trial and error is required and the scanning procedure can be performed quickly and with minimal training. If necessary, the operator can rotate the scanning tool 2 on the flat surface 22 to allow the voter to view the scanned information via the portable computing device 8 so as to allow confirmation of the accuracy of such information. If necessary, the operator can rotate the scanning tool 2 on the flat surface 22 to allow the voter to sign their signature and/or initials on the portable computing device 8, such as with a stylus, or input other information into the portable computing device as may be desired. The angle 24 may be selected to make capturing a signature optimal. To this end, the scanning tool 2 may be provided with felt or Teflon® pads (not shown) to facilitate rotation of the scanning tool on the flat surface 22. After the voter check-in process has been completed, the voter or poll worker can simply slide his or her identification card 10 forward and off of the second holding portion 6 of the scanning tool 2. To facilitate the removal of the personal identification card 10, the width of the surface 18 of the second holding portion 6 is preferably less than that of the personal identification card 10, such that the personal identification card hangs slightly off of the second holding portion as it is held by the second holding portion (as shown in the figures). This makes it easy for the voter or poll worker to grasp the personal identification card 10 when removing the personal identification card from the scanning tool 2.

Although the use of the scanning tool 2 has been described in reference to voting verification procedures, it should be appreciated that the same procedures could be used for other unrelated proposes. For example, the same steps described above would apply equally well for purposes of age verification in grocery stores, bars, and clubs.

Figure 6:
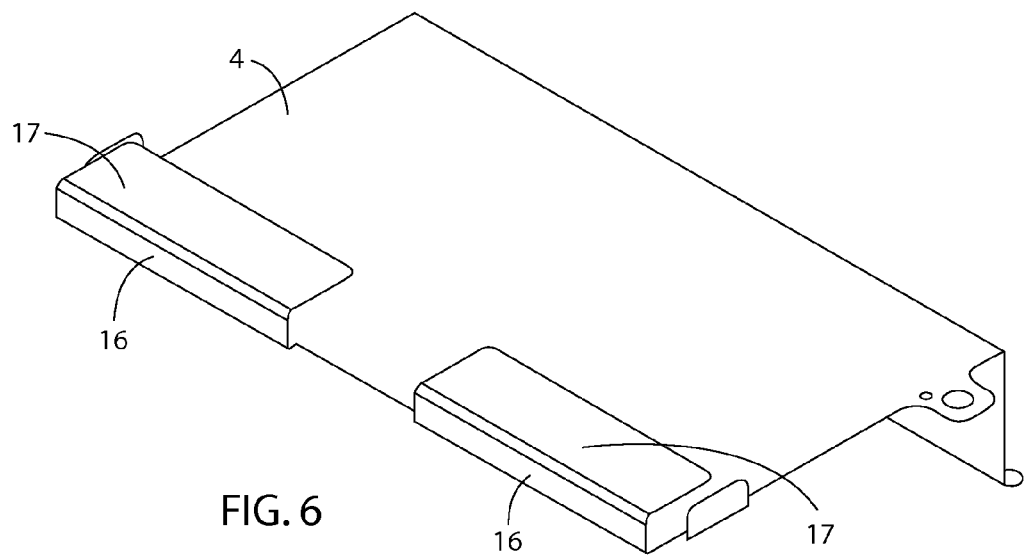
FIG. 6 is a perspective view showing an alternative embodiment of a personal identification card scanning tool in accordance with the invention, showing the top, back, and left sides of the scanning tool.
Figure 7:
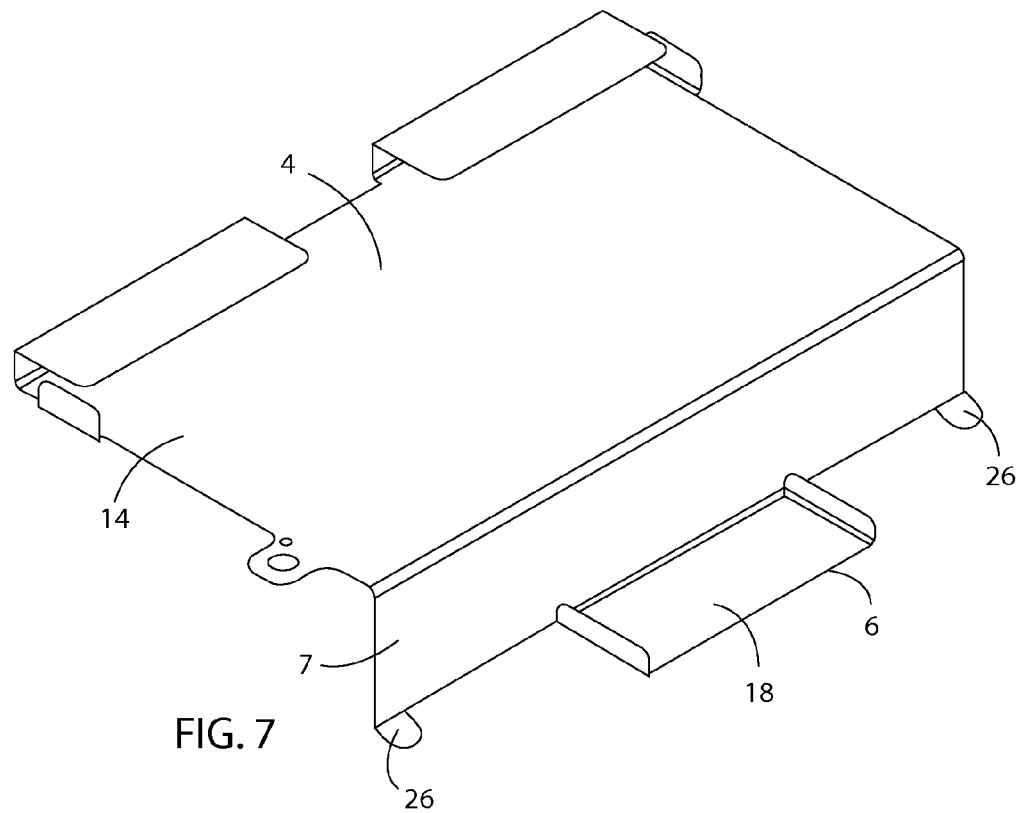
FIG. 7 is a perspective view showing the embodiment of the personal identification card scanning tool shown in FIG. 6, showing the top, front, and left sides of the scanning tool.

FIGS. 6 and 7 show an alternative embodiment of a scanning tool in accordance with the invention that comprises the aforementioned features, and as a few additional features. The retaining members 16 of the first holding portion 4 of this embodiment are adapted and configured to cover at least an area of the screen or controls of a portable computing device that is held by the first holding portion 4. This may be achieved, as shown in FIG. 6, by providing shroud portions 17 that protrude from the retaining members 16 and that are adapted to cover at least an area of the screen or controls of a portable computing device that is held by the first holding portion 4. Preferably, the shroud portions 17 are parallel or substantially parallel to the plane of the first holding portion 4 or otherwise configured to prevent viewing of and/or interaction with an area of the screen or controls of the portable computing device when it is held by the first holding portion 4. Although the shroud portions 17 cover an area of the portable computing device, they are adapted and configured to allow the portable computing device to be used to practice the invention (i.e., the retaining member 16 does not greatly impede the placement of the portable computing device on the first holding portion 4 and allows any necessary controls on the portable computing device to be accessed). One advantage of shroud portions 17 is that shroud portions also serve, together with the retaining members 16, to more securely hold the portable computing device on the first holding portion 4. Another advantage of shroud portions 18 is that they may prevent the viewing or interaction with certain displays or controls of the portable computing device. For example, the shroud portions may prevent voters or poll workers from touching controls on a portable computing device that are not necessary for them to operate the device. The position, number, and dimensions of the shroud portions 18 can be optimized for any particular one of various portable computing devices and even for various displays and controls on the same type portable computing device.

The embodiment of the scanning tool shown in FIGS. 6 and 7 also comprises support tabs 26 protruding from the bottom of the front of the connecting wall 7. The support tabs 26 are preferably configured so that when the scanning tool is placed on a flat surface, the support tabs 26 are generally parallel to the flat surface and support the front end of the scanning from the surface. Felt, Teflon®, or other low friction pads may be provided on the bottom of the support tabs 26 to lessen friction and facilitate movement such as rotation of the scanning tool on the flat surface.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the scanning tool does not necessarily have to be rigid and could instead be collapsible or partially pliable. Moreover, the scanning tool could be handheld and/or configured to hold the portable computing device and personal identification card even when inverted. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A personal identification card scanning tool comprising a first holding portion and a second holding portion, the first holding portion being configured and adapted to hold a portable computing device in a particular orientation, the second holding portion being configured and adapted to hold a personal identification card in a particular orientation, the first holding portion being structurally connected to the second holding portion in a manner such that the portable computing device and the personal identification card are fixed in relative positions and orientations with respect to each other and are generally parallel to and spaced apart from each other when the portable computing device is held by the first holding portion and the personal identification card is held by the second holding portion, the scanning tool being configured and adapted such that a line-of-sight exist between at least a portion of the portable computing device and at least a portion of the personal identification card when the portable computing device is held by the first holding portion and the personal identification card is held by the second holding portion.

2. A personal identification card scanning tool in accordance with claim 1 wherein the scanning tool is configured and adapted such that, when the portable computing device is held by the first holding portion and the personal identification card is held by the second holding portion and when the scanning tool is placed on a flat surface, the portable computing device and the personal identification card are held at an angle relative to the surface.

3. A personal identification card scanning tool in accordance with claim 1 wherein the first holding portion comprises retaining members and a surface, and the first holding portion is adapted and configured such that, when a portable computing device is biased against the surface of the first holding portion by gravity, the surface and gravity will prevent movement of the portable computing device in a first direction and the retaining members will limit movement of the portable computing device in at least one of the other two oblique directions relative to the first holding portion.

4. A personal identification card scanning tool in accordance with claim 3 wherein the first holding portion is configured and adapted such that the portable computing device can be slid onto and off of the surface of the first holding portion in one of the other of the other two oblique directions.

5. A personal identification card scanning tool in accordance with claim 1 wherein the second holding portion comprises retaining members and a surface, and the second holding portion is adapted and configured such that, when a personal identification card is biased against the surface of the second holding portion by gravity, the surface and gravity will prevent movement of the personal identification card in a first direction and the retaining members of the second holding portion will limit movement of the portable computing device in one of the other two oblique directions relative to the second holding portion, the second holding portion being configured and adapted such that the personal identification card can be slid onto and off of the surface of the second holding portion in the other of the other two oblique directions.

6. A personal identification card scanning tool in accordance with claim 5 wherein the first holding portion comprises retaining members and a surface, and the first holding portion is adapted and configured such that, when a portable computing device is biased against the surface of the first holding portion by gravity, the surface and gravity will prevent movement of the portable computing device in the first direction and the retaining members will limit movement of the portable computing device in at least one of the other two oblique directions relative to the first holding portion.

7. A personal identification card scanning tool in accordance with claim 6 wherein the scanning tool is configured and adapted such that, when the portable computing device is held by the first holding portion and the personal identification card is held by the second holding portion and when the scanning tool is placed on a flat surface, the portable computing device and the personal identification card are held at an angle relative to the surface.

8. A personal identification card scanning tool in accordance with claim 7 wherein the scanning tool is a monolithic rigid body formed of bent sheet metal.

9. A personal identification card scanning tool in accordance with claim 8 wherein the retaining members of the first holding portion are tabs extending upward and perpendicular from the surface of the first holding portion, and the retaining members of the second holding portion are tabs extending upward and perpendicular from the surface of the second holding portion.

10. A personal identification card scanning tool in accordance with claim 1 further comprising at least one shroud portion that is configured and adapted to cover at least one control button or control input area of a portable computing device that is held by the first holding portion.

11. A method of optically scanning information provided on a personal identification card, the method comprising activating a camera provided on a portable computing device to optically scan the information provided on a personal identification card, the portable computing device and the identification card being held by a scanning tool comprising a first holding portion and a second holding portion, the first holding portion holding the portable computing device in a particular orientation, the second holding portion holding the personal identification card in a particular orientation, the first holding portion being structurally connected to the second holding portion in a manner such that the portable computing device and the personal identification card are fixed in relative positions and orientations with respect to each other and are generally parallel to and spaced apart from each other in a manner such that the camera of the portable computing device is able to focus on the information provided on the personal identification card and such that the information provided on the personal identification card is generally maximized in the camera's field-of-view.

12. A method in accordance with claim 11 wherein the scanning tool rests on a surface and the portable computing device and the personal identification card are held by the scanning tool at an angle relative to the surface.

13. A method in accordance with claim 11 wherein the scanning comprises optically scanning a bar code provided on the personal identification card.

14. A method in accordance with claim 13 wherein the scanning tool rests on a surface and the portable computing device and the personal identification card are held by the scanning tool at an angle relative to the surface.

15. A method in accordance with claim 11 wherein the portable computing device comprises at least one control button or control input area and the scanning tool comprises at least one shroud portion that covers the at least one control button or control input area in a manner preventing inadvertant use of the at least one control button or control input area.

* * * * *